United States Patent [19]

Shaver

[11] 4,007,744
[45] Feb. 15, 1977

[54] GRAIN ACCELERATOR PRECLEANER
[75] Inventor: J. Lyle Shaver, Blue Springs, Mo.
[73] Assignee: Allis-Chalmers Corporation, Milwaukee, Wis.
[22] Filed: July 2, 1975
[21] Appl. No.: 592,713
[52] U.S. Cl. .............................. 130/27 Q; 209/32; 209/134; 209/153
[51] Int. Cl.² ........................................ A01F 12/24
[58] Field of Search .......................... 209/3, 32–35, 209/134–137, 153, 154, 312, 318, 145; 130/27 P, 27 Q, 27 S, 27 J, 27 K, 27 HF, 27 R

[56] References Cited
UNITED STATES PATENTS

| | | | |
|---|---|---|---|
| 1,290,610 | 1/1919 | Luedke | 130/27 K |
| 3,456,786 | 7/1969 | Lee | 209/34 |
| 3,635,336 | 1/1972 | Chapman | 209/3 |
| 3,813,184 | 5/1974 | Temple et al. | 130/27 HF |

FOREIGN PATENTS OR APPLICATIONS

| | | | |
|---|---|---|---|
| 222,254 | 5/1958 | Australia | 209/134 |
| 474,148 | 6/1951 | Canada | 209/33 |
| 642,914 | 3/1937 | Germany | 209/145 |

Primary Examiner—Frank W. Lutter
Assistant Examiner—Ralph J. Hill
Attorney, Agent, or Firm—Charles L. Schwab

[57] ABSTRACT

The threshed material leaving the threshing cylinder of a grain harvester or combine is accelerated into a transverse air stream by a pair of rolls. The rolls are disposed on parallel axes and are rotated at a relatively high speed in opposite directions whereby their confronting peripheries engage and accelerate the threshed material to a velocity substantially in excess of the speed at which such material would fall by gravity. A wide band of relatively high speed air is directed transversely through the accelerated material to provide a precleaning of straw and chaff from the material normally passing to the grain separation or cleaning shoe section of the combine. The grain in the accelerated material continues in a relatively straight line trajectory and the straw and chaff are separated from the grain by the transverse air stream.

9 Claims, 5 Drawing Figures

GRAIN ACCELERATOR PRECLEANER

BACKGROUND OF THE INVENTION

Heretofore, others have suggested increasing the downward velocity of threshed material and the velocity of the transverse air stream used to effect aerodynamic separation of the chaff from the grain. A technical paper "Aerodynamic Separation in a Combine Shoe" by D. W. Rumble and J. H. A. Lee prepared for presentation at the Dec. 10-13, 1968 meeting of the American Society of Agricultural Engineers at Chicago, Ill. relates to this subject and discloses use of belts to accelerate threshed material.

BRIEF DESCRIPTION OF THE INVENTION

A pair of gear-like accelerator rolls are used to accelerate threshed material across an air stream. A relatively high air stream velocity is used to move the chaff toward the rear of the cleaning shoe assembly whereby the chaff has less interference with the cleaning of the grain as it passes through the upper and lower sieves. A combine using this invention is able to efficiently harvest a high volume of material thus permitting a higher rate of harvesting than could be achieved with the same combine without the accelerator rolls.

It is a primary object of this invention to provide efficient grain separation by use of novel accelerator rolls downstream of the threshing cylinder in a grain harvester such as a combine.

DETAILED DESCRIPTION OF THE INVENTION

Figure 1:
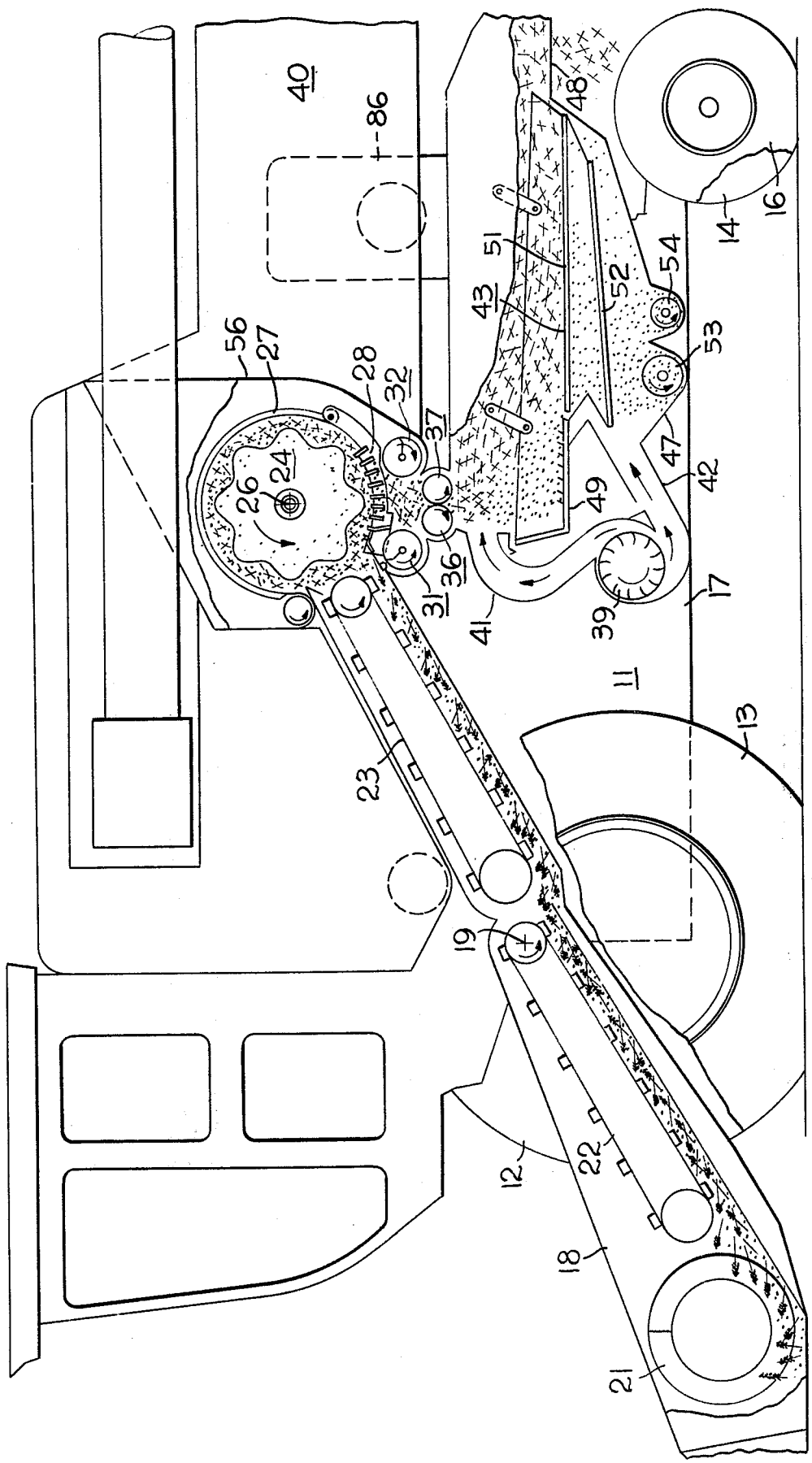
FIG. 1 is a side view of a combine with parts shown schematically and with parts broken away for purposes of illustrating the present invention.
Figure 2:
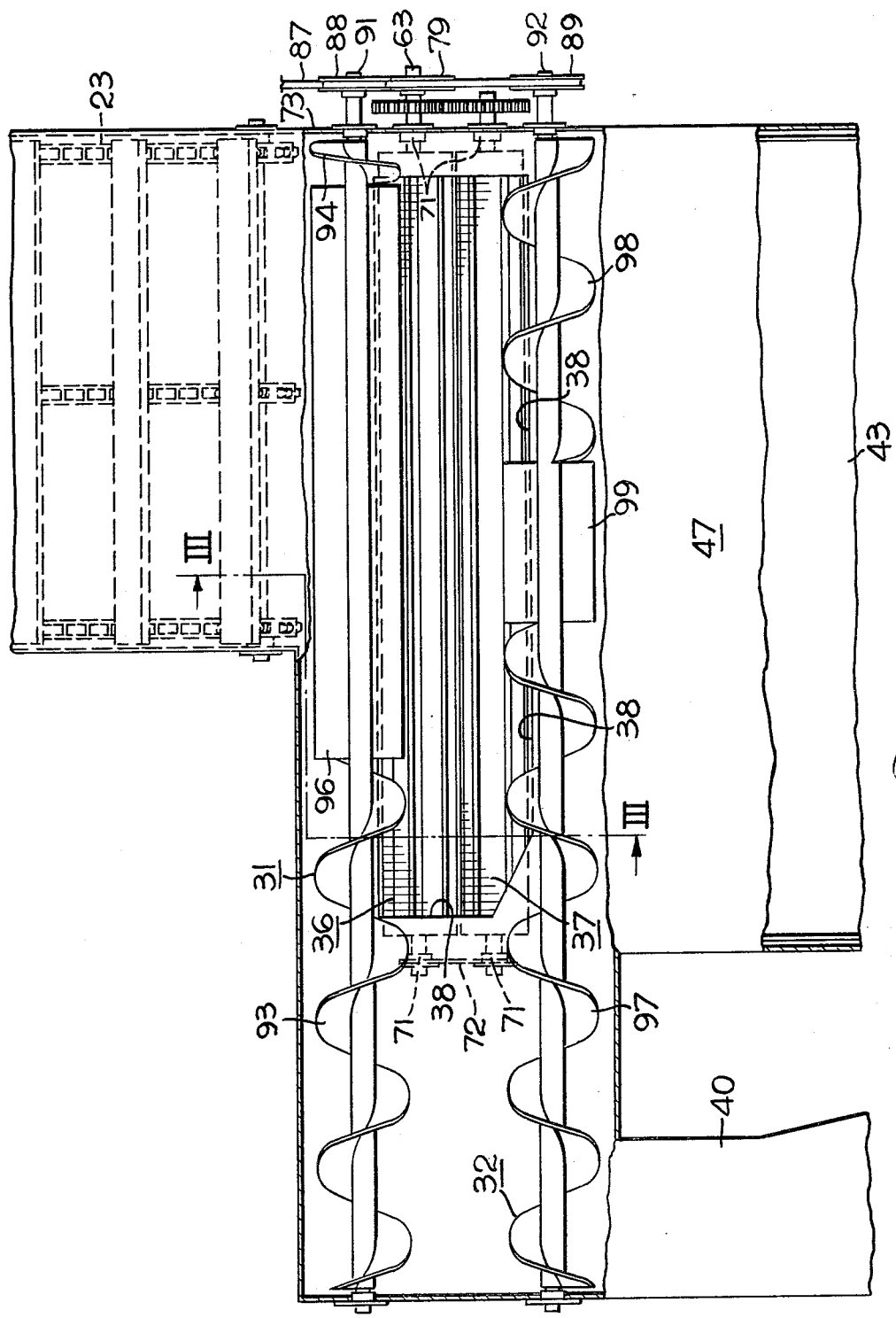
FIG. 2 is a view looking downwardly at the distribution augers and accelerator rolls of this invention.
Figure 3:
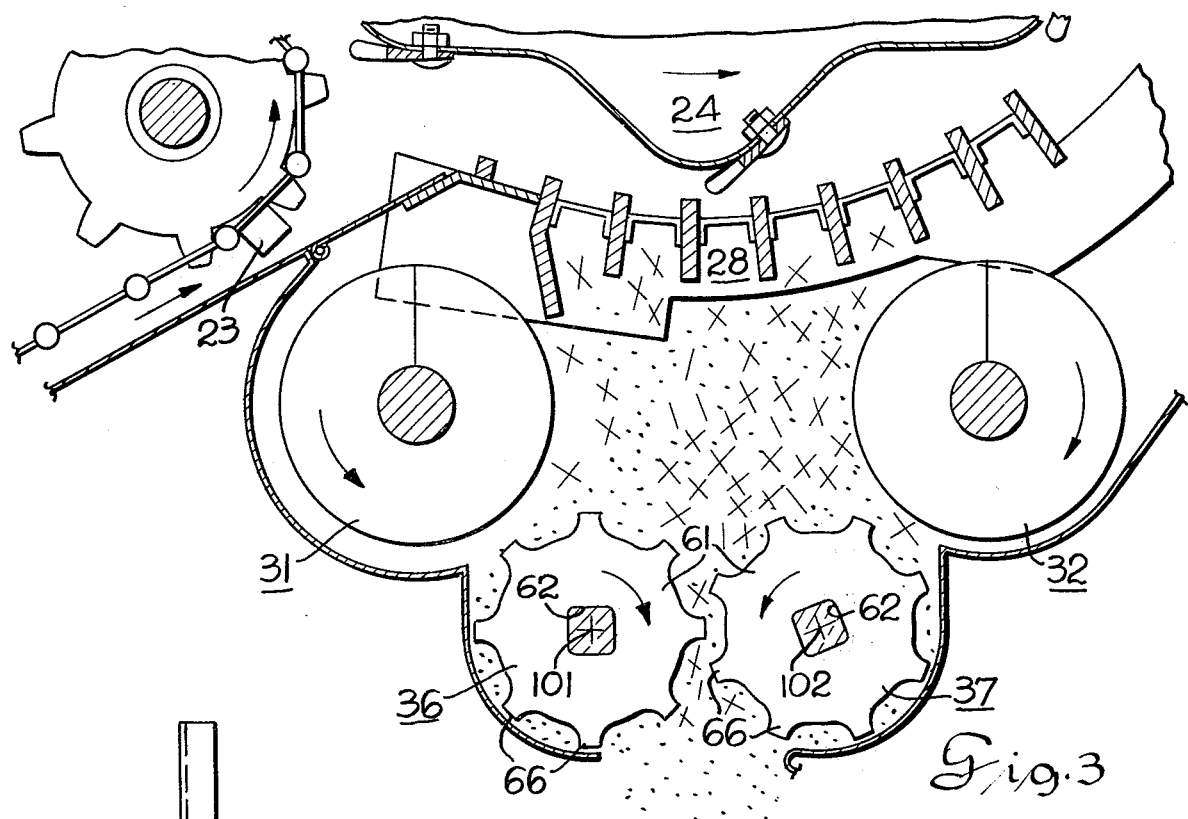
FIG. 3 is a section view along line III—III in FIG. 2.
Figure 4:
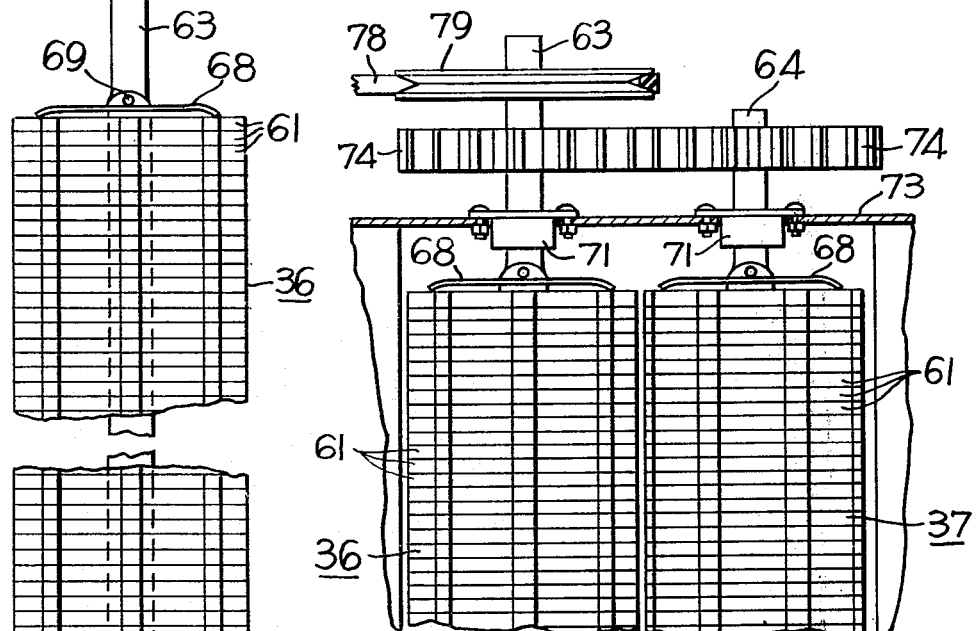
FIG. 4 is a top view of the driven end of the accelerator rolls.
Figure 5:
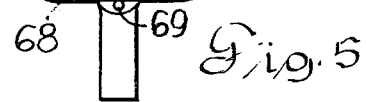
FIG. 5 is a top view of an accelerator roll.

Referring to FIG. 1, the combine 11 in which the present invention is illustrated includes a pair of front drive wheels 12, 13 and a pair of steerable rear wheels 14, 16 supporting a main frame 17. A header 18 is pivotably connected to the main frame on a transverse axis 19 for vertical adjustment of the cutting height. An auger 21 with oppositely pitched flights moves the cut grain inwardly from the transversely outward extending ends of the header to a central location where a first slat feeder 22 moves the cut stalks upwardly and rearwardly to a second flat feeder 23 which in turn moves the cut stalks to a threshing cylinder 24. The threshing cylinder 24 is mounted on the main frame 17 for rotation about a transverse axis 26 within a cylindrical stationary screen cage 27. An opening in the right front of the cage 27 permits cut stalks to pass into the cage 27 and a concave 28 is connected to the bottom of the screen cage 27 below the cylinder 24. Threshed material passing downwardly through the concave and through the screen of the cage 27 is guided by a pair of distribution augers 31, 32 to a transversely elongated slot above a pair of counterrotating accelerator rolls 36, 37. The straw which stays within the cage is moved axially by helical ribs on the inside of the cage to a discharge opening at the left rear of the cage where an appropriate discharge beater induces movement rearwardly through a straw discharge chute 40.

Referring also to FIGS. 2 through 5, the accelerator rolls 36, 37 increase the downward velocity of the threshed material passing downwardly through the transverse slot 38. A fan 39 directs air through upper and lower discharge ducts 41, 42 to the upper and lower regions of the shaker shoe assembly 43 mounted for longitudinal reciprocating movement on suitable rockers 44, 46. The transverse flow cleaning fan 39 and the ducts 41, 42 are of subtantially the same transverse width as the width of the separator portion 47 of the combine. The fan 39 and the upper duct 41 form air delivery means which directs air horizontally and rearwardly through the threshed material accelerated downwardly by the accelerator rolls 36, 37 whereby a very high percentage of the chaff in the accelerated material is blown rearwardly above the shoe assembly 43 and out the discharge opening 48. The separated grain kernels will be thrown downwardly into the grain pan 49 on the front end of the shaker shoe assembly 43. As the shoe assembly reciprocates fore and aft the kernels in the pan 49 move rearwardly and drop through the chaffer 51 and sieve 52 to the clean grain auger 53. Heavy material in the chaff blown rearwardly by the air discharge from duct 41 will drop onto the chaffer 51 and the reciprocation of the latter will tend to shake loose any kernels of grain held therein. The grain kernels will fall through the chaffer 51 onto the sieve 52 where further cleaning occurs. The clean, separated kernels fall through the sieve to the clean grain auger 53 and the material falling through the rear of the shaker shoe assembly is moved by the tailings auger 54 to an elevator, not shown, for elevation to the threshing chamber 56 so that it might pass through the threshing and separation processes once again.

Referring to FIGS. 2 through 5 the accelerator rolls 36, 37, disposed in underlying, downstream relation to the concave, comprise a plurality of discs 61 with aligned square openings 62 into which a square section part of the shafts 63, 64 extend. The discs 61 have a plurality of teeth 66 which, when the discs are assembled on the shafts, form lugs extending axially the length of the rolls. The discs 61 are made of used tire carcasses or other suitable rubber-like material and are held in place on the shafts 63, 64 by suitable retainers 68 pinned to the shafts by pins 69. The opposite ends of the shafts 63, 64 are rotatably supported in suitable bearings 71 mounted on vertical side walls 72, 73 of the combine. Power mens for the rolls 36, 37 include timing means in the form of a pair of equal diameter meshing spur gears 74 which are nonrotatably secured to corresponding ends of the shafts 63, 64. The rolls 36, 37 are phased or timed so that the lugs on the rolls do not register with one another when rotated by a V-belt 78 entrailed about a pulley 79 nonrotatably secured to the end of shaft 63. The lugs on the rolls 36, 37 are equally spaced a circumferential distance greater than twice the circumferential width of the lugs and the lugs on the rolls 36, 37 are in meshing relationship without actually touching one another. The lugs have a positive gripping relationship with the material passing thereto from the concave and substantially increases its downward velocity. Increasing the downward velocity of the threshed material permits the velocity and volume of the transverse air flow from duct 41 to be increased without adverse grain loss. In fact, a higher volume of threshed material can be handled by the combine by use of the accelerator rolls with increased flow of air from duct 41. This is achieved while maintaining excellent efficiency; that is, grain loss is maintained at a very low level.

Referring again to FIGS. 1 and 2, power means in the form of an internal combustion engine 86 is drivingly connected to the various propelling, cutting, conveying, threshing, separating and blowing means on the combine by suitable power transmitting means including a belt 87 which cooperatively engages pulleys 88, 89 nonrotatively secured to the shafts 91, 92 of distribution augers 31, 32 whereby the latter are rotated in opposite directions so as to urge the material passing through the concave 28 and screen 27 to the slot 38. The auger 31 includes oppositely pitched flights 93, 94 and a paddle section 96 and auger 32 includes oppositely pitched flights 97, 98 and a paddle section 99. The accelerator rolls 36, 37 are spaced longitudinally of one another on parallel transverse axes 101, 102 which are spaced from one another a distance equal to the outer diameter of the rolls 36, 37 which are of equal diameter. In other words, the axes 101 and 102 are spaced horizontally from one another by a distance equal to one half of the sum of the outer diameters of the rolls. By making the openings through the center of the discs 61 noncircular, the complementary noncircular cross section shaft portion of each shaft passing through such openings is in torque transmitting engagement with the discs 61. The side by side stack of discs of reclaimed automobile tire material make cylinders for the rolls which are economical to manufacture, have good wearing characteristics and give long trouble-free performance. The accelerator rolls may be made of soft rubber-like material without lugs in which event the rolls would resiliently deflect as threshed material is gripped and passed therebetween.

The embodiments of the invention in which an exclusive property or privilege is claimed are defined as follows:

1. In a grain harvester having a threshing cylinder, and a concave on the underside of said cylinder, the combination comprising:
    a shaker shoe assembly including a grain pan at its forward end disposed beneath said concave,
    a pair of side by side accelerator rolls disposed above said grain pan and in underlying relation to said concave, said accelerator rolls being disposed on horizontally spaced parallel axes and receiving therebetween threshed material from said concave,
    power means driving said accelerator rolls in opposite directions whereby threshed material passing between said rolls is accelerated downwardly toward said grain pan, and
    air delivery means directing a predetermined horizontal rearward flow of air through and transverse to the accelerated threshed material passing from said accelerator rolls to blow the chaff and straw particles rearwardly from the kernels of grain which pass downwardly to the grain pan.
2. The combination of claim 1 wherein said accelerator rolls are substantially parallel to said threshing cylinder.
3. The combination of claim 1 wherein each of said rolls have circumferentially spaced lugs.
4. The combination of claim 3 wherein said lugs mesh without touching during rotation of said rolls.
5. The combination of claim 3 wherein said lugs are equally spaced and wherein said power means drives said rolls at equal speeds.
6. The combination of claim 5 wherein said power means includes timing means maintaining said lugs on one roll out of phase with the lugs of said other roll.
7. The combination of claim 6 wherein said axes of said rolls are spaced from one another a distance equal to one-half the sum of the outer diameters of said rolls.
8. The combination of claim 7 wherein the diameters of said rolls are substantially equal.
9. The combination of claim 1 wherein said rolls are made of soft rubber-like material.

* * * * *